United States Patent [19]

Miyata et al.

[11] 3,792,355

[45] Feb. 12, 1974

[54] ORTHOGONAL TRANSFORMATION CIRCUIT USING HADAMARD MATRICES

[75] Inventors: Masachika Miyata, Kodaira; Takahiko Fukinuki, Kokubunji, both of Japan

[73] Assignee: Hitachi, Ltd., Tokyo, Japan

[22] Filed: Dec. 10, 1971

[21] Appl. No.: 206,691

[30] Foreign Application Priority Data

Dec. 11, 1970 Japan .......... 45-109527
May 21, 1971 Japan .......... 46-34008

[52] U.S. Cl. .......... 325/42, 179/15 BC, 328/56
[51] Int. Cl. .......... H04j 3/18
[58] Field of Search ..... 179/15 BC; 325/42; 328/56, 328/103

[56] References Cited

UNITED STATES PATENTS 3,611,142 10/1971 Welti .......... 325/42
3,089,921 5/1963 Hines .......... 179/15 BC

*Primary Examiner*—Malcolm A. Morrison
*Assistant Examiner*—R. Stephen Dildine, Jr.
*Attorney, Agent, or Firm*—Craig and Antonelli

[57] ABSTRACT

An orthogonal transformation circuit in which unit transformation circuits are connected in cascade in accordance with a desired order of transformation. Each unit transformation circuit comprises a first delay circuit which delays discrete signals by a fixed time, an arithmetic circuit which provides the sum and difference between input and output signals of the delay circuit, a second delay circuit which delays the difference signal of the arithmetic circuit by the same delay time as that of said first delay circuit, and a gate circuit which provides output signals such that the sum signal from the arithmetic circuit and the difference signal from the second delay circuit are alternated at a fixed time interval.

16 Claims, 6 Drawing Figures

INVENTORS
MASACHIKA MIYATA,
TAKAHIKO FUKINUKI
BY Craig, Antonelli & Hill
ATTORNEYS INVENTORS
MASACHIKA MIYATA,
TAKAHIKO FUKINUKI
BY Craig, Antonelli & Hill
ATTORNEYS

ORTHOGONAL TRANSFORMATION CIRCUIT USING HADAMARD MATRICES

BACKGROUND OF THE INVENTION

1. Field of the Invention

The present invention relates to a circuit which transforms a block of discrete signal such as pulse signals, and more particularly to an arrangement of an orthogonal transformation circuit which transforms a plurality of signals in the time series using Hadamard matrices.

2. Description of the Prior Art

As a form of transmitting discrete information as in PCM communication systems or the like, an information transmission system is known in which, due to noise dispersion over the information tranmission line and band compression, an information sample is not transmitted as a single sample, but rather is transmitted in a multiplex manner using a block coding by an orthogonal transform. At the receiver, the multiplexed information is analyzed and separated and the required information is composed. A method of orthogonal transform which is especially effective in PCM communication is the Hadamard transformation which transforms discrete pulse codes by means of Hadarmard matrices. The Hadamard matrix is a matrix in which the elements are either +1 or −1 and in which the respective row vectors and also the respective column vectors are mutually orthogonal. A commonly used matrix is one of the $2^n$-th order ($n$ being an integer). The matrices are generally expressed as follows:

$$H_n = \begin{bmatrix} H_{n-1} H_{n-1} \\ H_{n-1} - H_{n-1} \end{bmatrix} \quad (1)$$

$$H_0 = [1] \quad (2)$$

The respective matrices are inductively evaluated from the general expressions. For example, $$H_1 = \begin{bmatrix} 1 & 1 \\ 1 & -1 \end{bmatrix} \quad (3)$$

$$H_2 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (4)$$

Assuming that a series of discrete signals are represented by $X_1, X_2, X_3 \ldots$, when these signals are subjected to the Hadamard transformation of the second order (n = 1), a series of transformed signals $y_1, y_2, y_3 \ldots$ are generally determined by the following equation:

$$\begin{bmatrix} y_i \\ y_{i+1} \end{bmatrix} = \begin{bmatrix} 1 & 1 \\ 1 & -1 \end{bmatrix} \begin{bmatrix} x_i \\ x_{i+1} \end{bmatrix} = \begin{bmatrix} x_i + x_{i+1} \\ x_i - x_{i+1} \end{bmatrix} \quad (5)$$

where $i = 1, 3, 5 \ldots$

Circuits for effecting the Hadamard transformation have heretofore mainly used resistor matrix circuits. As shown in FIG. 1, which represents the prior art transformation circuit arrangement, time-series signals from an input terminal 1 are converted into parallel signals by a deserializer 2 and are fed to a resistor matrix circuit 3 in which the signals are Hadamard-transformed. The matrix circuit provides an output of parallel signals which are restored to the series format by a serializer 4. The output signals are thus transmitted in the form of time-series signals from an output terminal 5. With such an arrangement, the signals are added in an analog manner by the matrix circuit 3. Therefore, in the case where a high order matrix is utilized, the requirement of precision for the circuit elements becomes extremely critical and a serious disadvantage is brought about in that the circuit may not be made integrated.

SUMMARY OF THE INVENTION

A principal object of the present invention is to provide an orthogonal transformation circuit which is simple in construction.

Another object of the present invention is to provide an orthogonal transformation circuit with a delay circuit and a digital arithmetic circuit without employing a serializer, a deserializer and a resistor matrix circuit, thereby overcoming the drawbacks of the prior art arrangements.

Still another object of the present invention is to provide an orthogonal transformation circuit which may be made as IC, LSI, or the like integrated circuits.

Yet another object of the present invention is to provide a circuit arrangement which in constituting an orthogonal transformation circuit utilizing the Hadamard matrix, may change the order of the matrix by the cascade connection of unit transformation circuits.

In accordance with the present invention, there is provided a fundamental unit circuit having two delay circuits which have the same delay times, an arithmetic logic circuit which provides output signals of the sum and difference between signals entering at the delay time, and a gate circuit which selects the outputs of the arithmetic circuit at a fixed time interval. Also, according to a feature of the present invention, one or a plurality of such fundamental unit circuits are arranged in cascade connection in conformity with the order of the Hadamard matrix to perform the desired transformation.

According to several embodiments of the present invention, the first delay circuit is connected to a terminal at the input side of signals to-be-transformed, while the second delay circuit is connected between the first delay circuit and the arithmetic circuit or the output side of the arithmetic circuit. A gate circuit is provided at the output of the transformation circuit and the arithmetic circuit and the gate circuit may be formed as separate or integral circuits.

In accordance with the present invention, all the delay circuits and arithmetic gate circuits forming the transformation circuit consist of transistors and known logic elements composed of impedance elements. These circuits are easily formed as integrated circuits such as IC and LSI. Thus, the circuit arrangement may be provided in a small size. In addition, since the whole arrangement may be formed by digital, logic circuits, the precision required for the elements becomes moderate in comparison with the orthogonal transformation circuit formed by a resistor matrix circuit. Accordingly, this feature presents many advantages in constructing the circuit.

According to a further feature of the present invention, when the order of the Hadamard matrix is of $2^n$-th, $n$ (an integer) unit transformation circuits constituted as described above may be connected in cascade. Accordingly, a transformation circuit of a required order may easily be provided in conformity with the order of the Hadamard matrix for transformation. When the circuits are cascaded, the delay period of the delay circuits constituting each of the $n$ combined unit transformation circuits are respectively set at one of $2^k$ ($k = 0, 1, 2, 3 \ldots n-1$) times as long as the period T of input signals to-be-transformed with each of the unit circuits having different delay periods.

These and further objects, features and advantages of the present invention will become more obvious from the following description when taken in connection with the accompanying drawing which shows for purposes of illustration only, several embodiments in accordance with the present invention.

DESCRIPTION OF THE PREFERRED EMBODIMENTS

Figure 1:
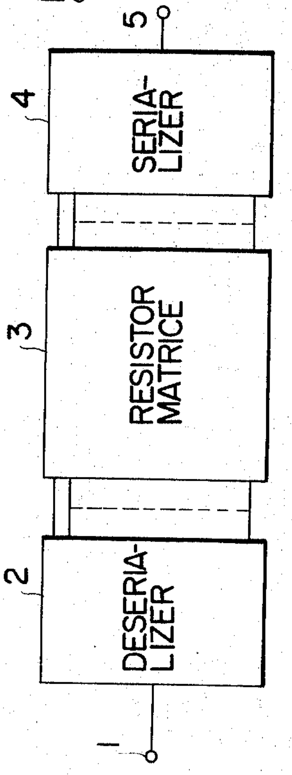
FIG. 1 is a block diagram of a prior-art orthogonal transformation circuit using a resistor matrix circuit.

Referring now to the drawing wherein like reference numerals designate like parts throughout the several figures, FIG. 1 shows the prior art circuit arrangement for effecting the Hadamard transformation including an input terminal 1, a deserializer 2, a resistor matrix 3, a serializer 4 and an output terminal 5.

Figure 2:
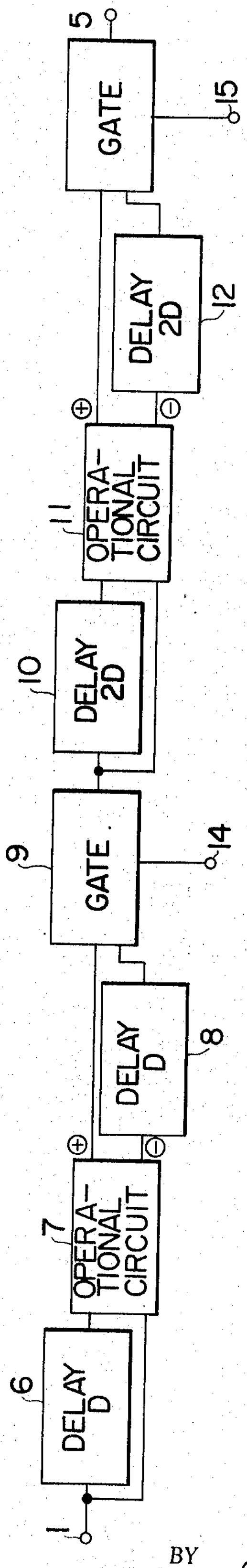
FIG. 2 is a block diagram arrangement of an orthogonal transformation circuit using the second-order Hadamard matrix according to the present invention.

FIG. 2 is a block diagram arrangement of an embodiment of an Hadamard transformation circuit of the fourth order $H_2$ according to the present invention. In this figure, reference numerals 1 and 5 designate an input terminal and an output terminal, respectively. Reference numerals 6 and 8 represent delay circuits which effect a delay by a unit time period, i.e. a time identical to the fundamental period of an input signal applied to the input terminal 1. The circuit also includes delay circuits 10 and 12, both of which have a delay time period twice as long as the above-mentioned unit time period. Reference numerals 7 and 11 indicate arithmetic circuits, each performing an addition and subtraction of the two input signals applied thereto. The summed output signals of the arithmetic circuits are directly applied to gate circuits 9 and 13, while the difference output signals are applied via the delay circuits 8 and 12 to the gate circuits 9 and 13, respectively. The gate circuits have driving signals applied thereto from gate-driving signal terminals 14 and 15, so as to prevent the sum output and the difference output from being simultaneously entered in each gate circuit.

For clarity in the drawing, the connection between the delay circuits, the arithmetic circuits and the gate circuits is shown as a single wire. When a plurality of binary signals, constituting time series signals $x_1, x_2, x_3 \ldots$ applied to the input terminal 1 (the time series signals corresponding to, e.g., sampling signals of a picture, and each is composed of binary signals of several bits), are in parallel, the same number of lines or wires as that of the binary signals are provided. When the binary signals are in series, the line may be considered to be a single wire. While clock pulses or the like for regulating the timing relations are, if necessary, impressed upon the arithmetic circuits and the delay circuits, this circuitry is not necessary for an understanding of the subject matter of the present invention and for purposes of clarity, are accordingly omitted.

Figure 3:
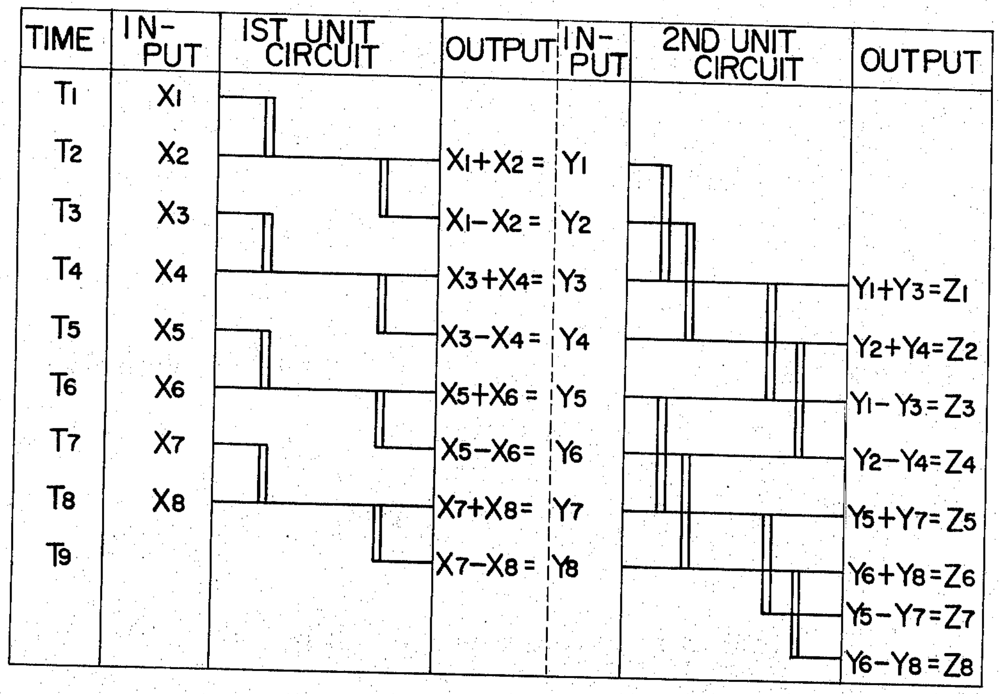
FIG. 3 is a time chart for explaining the operation of the embodiment shown in FIG. 2.

Referring now to FIG. 3, there is shown a time chart indicating the operation of the second-order Hadamard unit transformation circuit of FIG. 2. In this chart, the vertical direction represents the lapse of time, the horizontal direction represents the flow of signals, and portions of the chart with two vertical lines represent time delays in the delay circuits.

The signals $x_1, x_2, x_3 \ldots$ to be transformed, are applied to the input terminal 1 at fixed periods T. The signal $x_1$ applied to the input terminal 1 at time $t_1$ is delayed by the period of time T by means of the delay circuit 6, and is applied to the arithmetic circuit 7 at time $t_2$. Simultaneously therewith, the input signal $x_2$ is directly applied from the input terminal 1 to the arithmetic circuit 7 at the time $t_2$. Accordingly, a sum signal $x_1 + x_2$ is provided at the sum output terminal $\oplus$ of the arithmetic circuit, while a difference signal $x_1 - x_2$ is provided at the difference output terminal$\ominus$. The sum signal $x_1 + x_2$ is directly applied to the sum signal input of gate circuit 9. On the other hand, the difference signal $x_1 - x_2$ is further delayed by the period of time T by means of the delay circuit 8, and is applied to the difference signal input of gate circuit 9 at time $t_3$. At the time $t_3$, however, a signal $x_2 + x_3$ is also applied to the sum signal input of the gate circuit by the process as described above. Therefore, when the gate-driving signals are applied from the terminal 14 so as to alternately select the sum signal and the difference signal from the gate circuit at the period T, the signal $x_1 + x_2$ is provided at the output of the gate circuit 9 at the time $t_2$, while the signal $x_1 - x_2$ is provided at the time $t_3$, the sum signal $x_2 + x_3$ being blocked. Sums and differences $x_3 + x_4, x_3, - x_4, x_5 + x_6, \ldots$ are respectively obtained at times $t_4, t_5, t_6, \ldots$ by processes similar to the above operations. In the general expression, outputs $y_i$ and $y_{i+1}$ at times $t_{i+1}$ and $t_{i+2}$ become $x_i + x_{i+1}$ and $x_i - x_{i+1}$, respectively. Thus, $$\begin{bmatrix} y_i \\ y_{i+1} \end{bmatrix} = \begin{bmatrix} 1 & 1 \\ 1 & -1 \end{bmatrix} \begin{bmatrix} x_i \\ x_{i+1} \end{bmatrix} = H_1 \begin{bmatrix} x_i \\ x_{i+1} \end{bmatrix}$$

This means that the second-order (n=1) Hadamard transformation is carried out.

The output signals of the gate circuit represented by $y_1, y_2, y_3 \ldots$ with these signals being applied as inputs to the second cascaded unit transformation circuit comprising the delay circuits 10 and 12, the addition and subtraction circuit 11, the gate circuit 13 and the output terminal 5. Thus, the Hadamard transformation is effected by operations as in the first unit transformation circuit. The second unit transformation circuit and the first one from the delay circuit 6 to the gate circuit 9 are, in principle, the same in construction and operation. The only difference is that the delay time period of the delay circuits 10 and 12 is twice as long as in the delay circuits 6 and 8, i.e. 2T, and that the period of the gate-driving signals applied to the gate circuit 13 is 2T.

In circuit arrangement of FIG. 2, signals from the output terminal 5 are represented by $Z_1, Z_2, Z_3 \dots$. Accordingly, when the output signals $y_1, y_2, y_3 \dots$ of the first unit transformation circuit are applied as inputs to the second transformation circuit, a flow of signals as in the right half of FIG. 3 is effected by operations similar to that of the first unit transformation circuit, and the output signals $Z_1, Z_2, Z_3 \dots$ become $y_1 + y_3$, $y_2 + y_4$, $y_1 - y_3 \dots$, respectively.

It is apparent from the above operations that the following relation holds between the outputs $Z_1, Z_2, Z_3 \dots$ and the inputs $x_1, x_2, x_3 \dots$:

$$\begin{bmatrix} Z_1 \\ \cdot \\ \cdot \\ \cdot \\ Z_4 \end{bmatrix} = H_2 \begin{bmatrix} x_1 \\ \cdot \\ \cdot \\ \cdot \\ x_4 \end{bmatrix} \quad \begin{bmatrix} Z_5 \\ \cdot \\ \cdot \\ Z_8 \end{bmatrix} = H_2 \begin{bmatrix} x_5 \\ \cdot \\ \cdot \\ x_8 \end{bmatrix} \tag{6}$$

That is, the Hadamard transformations by $H_2$ are performed. While the above description has been directed to the embodiment of the $2^2$-th order of Hadamard transformation, it is to be understood from the property of the Hadamard matrices and the explanation of the embodiment that if, in general, $n$ unit transformation circuits are connected in cascade, the $2^n$-th order of Hadamard transformation circuit may be effected.

The input signals $x_i$ are digital signals, and may be either series signals or parallel signals as has been stated above. For example, series: $\underbrace{101011}_{x_1}$ $\underbrace{100101}_{x_2}$ $\underbrace{001101}_{x_3}$ . . .

parallel:

1 1 0 . . .
0 0 0 . . .
1 0 1 . . .
0 1 1 . . .
1 0 0 . . .
1 1 1 . . .
$x_1$ $x_2$ $x_3$ . . .

When the input signals are parallel signals, the gate circuits are arranged at every bit in the above-described embodiment. The relations among the delay time D of the delay circuits constituting the unit transformation circuit, the clock period $\tau$ of inputs, and the order $k$ of the unit transformation circuit in the cases of the series and parallel signals, are given below. For the series signals, the unit time T is $T = \tau$ times (the number of inputs bits), i.e. 6 $\tau$ in the above-mentioned example. For parallel signals $T = \tau$. Therefore, the delay time of the k=th unit transformation circuit may be set at D = (the number of inputs bits) times $\tau$ times $2^k$ in the series case, while at $D = \tau$ times $2^k$ in the parallel case.

Although the foregoing description has been directed to the circuit arrangement which Hadamard transforms the input signals $x_1, x_2, x_3 \dots$, the so-called inverse Hadamard transformation circuit which transforms the transformed signals $Z_1, Z_2, Z_3 \dots$ into the signals $x_1, x_2, x_3 \dots$ again, may also be effected by a circuit which is quite similar to the transformation circuit described above. As is well-known, the following relation is provided:

$$H_n H_n = 2^n E \tag{7}$$

where E represents a unit matrix of the $2^n$-th order. Accordingly, in order to obtain $x_1, x_2, x_3 \dots$ from $Z_1, Z_2, Z_3 \dots$ which are transformed by the Hadamard matrix $H_2$ in the previous embodiment, the transformed signals $Z_1, Z_2, Z_3 \dots$ are subjected to a transformation by the Hadamard matrix $H_2$. Then, from equations (6) and (7), $$H_2 \begin{bmatrix} Z_1 \\ Z_2 \\ Z_3 \\ Z_4 \end{bmatrix} = H_2 H_2 \begin{bmatrix} x_1 \\ x_2 \\ x_3 \\ x_4 \end{bmatrix} = 4 \begin{bmatrix} 1000 \\ 0100 \\ 0010 \\ 0001 \end{bmatrix} \begin{bmatrix} x_1 \\ x_2 \\ x_3 \\ x_4 \end{bmatrix} = 4 \begin{bmatrix} x_1 \\ x_2 \\ x_3 \\ x_4 \end{bmatrix} \tag{8}$$

Figure 4:
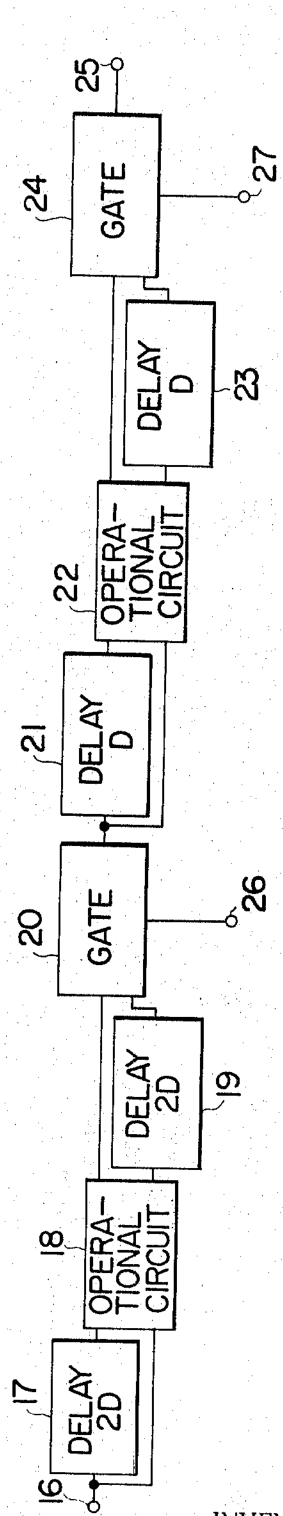
FIG. 4 is a block diagram arrangement of a circuit according to the present invention which inversely transforms signals having been transformed by the embodiment in FIG. 2.

Accordingly, an inverse transformation circuit as shown by the embodiment of FIG. 4 may be formed for the signals which have been transformed by the Hadamard transformation circuit in FIG. 2. In FIG. 4, reference numeral 16 designates an input terminal. Reference numberals 17 and 19 both represent delay elements of two unit periods of time while delay elements 21 and 23 have delays of one unit period of time. Arithmetic circuits 18 and 22 are also provided for effecting an addition and subtraction of the signals for carrying out a transformation corresponding to ½ $H_1$. Reference numerals 20 and 24 indicate gate circuits, while reference numerals 26 and 27 designate termainals for applying gate-driving signals. The inverse transformation output signal is provided at output terminal 25. The construction and operation of the circuit elements is the same as that of the circuit elements of the circuit illustrated in FIg. 2, and hence, a detailed explanation is omitted. While this embodiment shows an example of the $2^2$-th order for the purpose of inversely transforming the transformed signals in FIG. 2, it is apparent that an inverse transformation of the $2^n$-th order may be performed by connecting $n$ unit transformation circuits in cascade as has been stated with reference to FIG. 2. Further, while the coefficients of the respective unit transformation circuits in FIGS. 2 and 4 are made $H_2$ — $H_2$ on the transformation side and ½ $H_1$ — ½ $H_1$ on the inverse transformation side in order to make the levels of inputs and outputs equal, the present invention is not limited to the described coefficients. It is only necessary that the relationship of equation (7) be maintained. For example, the coefficients may be made $2^{-n}H_n$ on the Hadamard transformation side and $H_n$ on the inverse transformation side. In addition, the matrices may be normalized to make $2^{-n}H_n$ the coefficient of the Hadamard transformation and the inverse transformation.

In the foregoing description, the unit transformation circuit has been constructed in accordance with the embodiment in FIG. 2 of the Hadamard transformation circuit of the fourth order $H_2$ and the inverse transformation circuit therefor as shown in FIG. 4. The unit transformation circuit, however, is not limited to the embodiment in FIG. 2, but it may also be constituted by circuit arrangements as shown in FIGS. 5 and 6.

Figure 5:
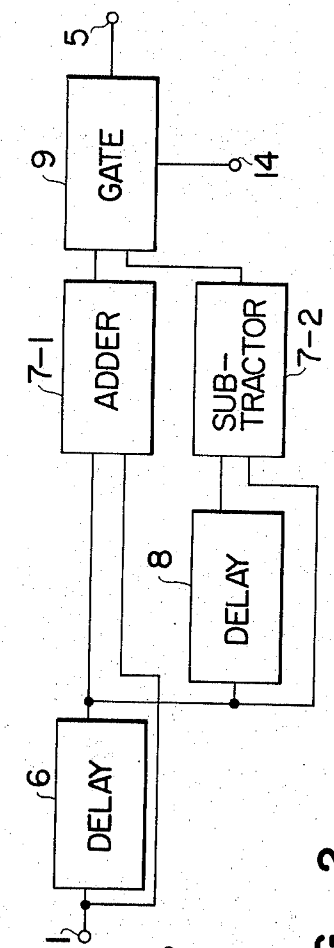
FIG. 5 is a block diagram arrangement of a unit transformation circuit according to another embodiment of the present invention.

The circuit in FIG. 5 is almost the same in principle as the unit circuit of the circuit arrangement in FIG. 2, with the difference being that the second delay circuit 8 is positioned on the input side of an arithmetic circuit (subtraction) 7 – 2. Thus, there is a difference whether the delay is effected after the difference signal is obtained, or the operation for obtaining the difference is carried out after the delay at the input. However, the resultant operation is the same. In this figure, parts or circuits designated by the same reference numerals as in FIG. 2 have the same functions and operation and the detailed explanation thereof is omitted.

It should be noted that the arrangement of the unit transformation circuit of the present invention does not necessarily require the setting of the connecting positions of the gate circuit and the arithmetic circuit or circuits as shown in the foregoing embodiments in the gate circuit and the arithmetic circuit or circuits may be made integral, or the arithmetic circuit may comprise only an addition circuit in some arrangements of the gate circuit.

Figure 6:
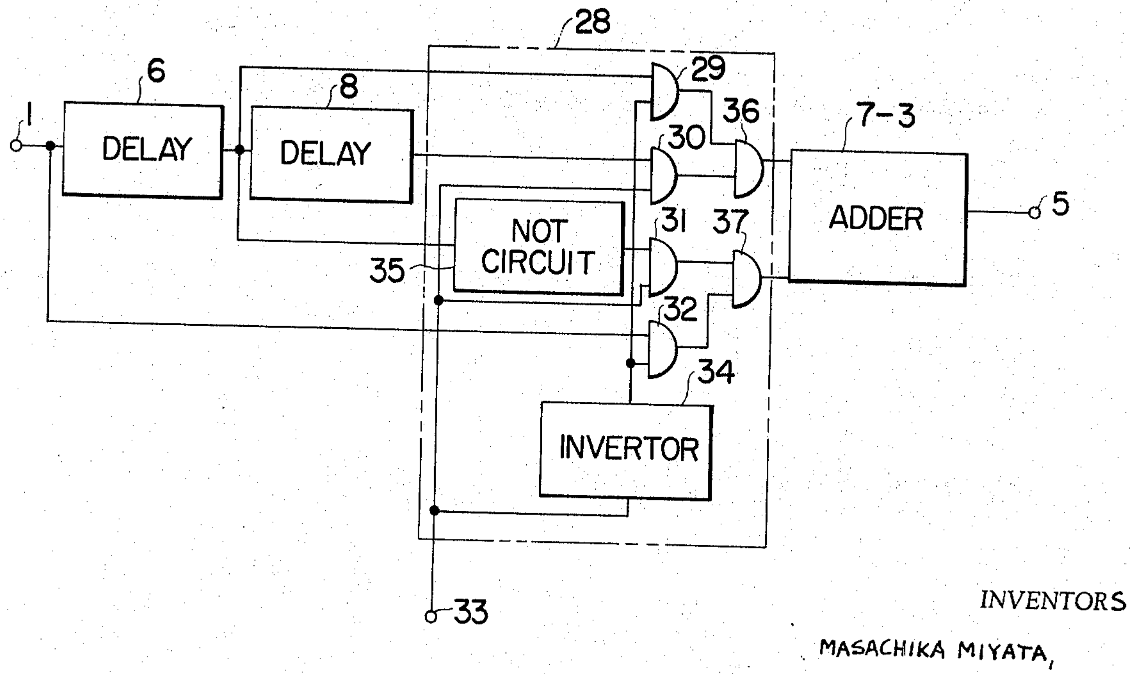
FIG. 6 is a block diagram arrangement of another embodiment of a unit transformation circuit.

FIG. 6 shows an arrangement of another embodiment of the unit transformation circuit of the present invention, in which a gate circuit 28 is arranged on the input side of an arithmetic circuit 7 – 3 and in which the arithmetic circuit comprises only an addition circuit. This embodiment utilizes the fact that, in order to effect the subtraction, the complement of the subtraction may be added. In this figure, reference numerals 1, 5, 6 and 8 represent the input terminal, the output terminal, the first delay circuit and the second delay circuit, respectively, which are the same as those with the same reference numerals in the foregoing embodiments.

Signals at the respective terminals of the circuit elements 1, 6 and 8 are applied to AND gates 29, 30, 31 and 32 which form the gate circuit 28. Gate-driving signals are square wave which have the same period and duty cycle as the delay time of the delay circuits, are applied from a terminal 33 to the AND gates. In this embodiment, the driving signals are applied to the AND gates 29 and 33 through a polarity inverter circuit 34. Between the output portion of the first delay circuit 6 and the AND gate 31, there is a NOT circuit 35. As a result, when the input signals are $x_1, x_2, x_3 \ldots$, the AND gate 31 has $-x_1, -x_2, -x_3 \ldots$ applied thereto. Outputs of the AND gate circuits are added in the adder circuit 7 –3 via OR circuits 36 and 37, thereby obtaining a predetermined transformed signal at the output terminal 5.

Assuming that the output signals at the input terminal, the first delay circuit and the second delay circuit are designated A, B and C, respectively, that the output signals of the OR gates 36 and 37 are designated D and E, respectively, and that the output signal of the adder circuit is F, then the output signals at each time interval are determined as shown in the following table by the gate-driving signals of the gate circuit.

| time | A | B | C | D | E | F |
|---|---|---|---|---|---|---|
| $t_1$ | $x_1$ | | | | | |
| $t_2$ | $x_2$ | $x_1$ | | $x_1$ | $x_2$ | $x_1+x_2$ |
| $t_3$ | $x_3$ | $x_2$ | $x_1$ | $x_1$ | $-x_2$ | $x_1-x_2$ |
| $t_4$ | $x_4$ | $x_3$ | $x_2$ | $x_3$ | $x_4$ | $x_3+x_4$ |
| $t_5$ | . | . | . | . | . | . |
| . | . | . | . | . | . | . |

It can thus be seen that the output signals provided by this embodiment are the same as those of the first unit transformation circuit as indicated in the time chart in FIG. 3. If the delay circuit 6 provides a negative output in addition to the positive output, the NOT circuit 35 provided at the input of the gate circuit 31 is not necessary.

In the foregoing description, block diagram arrangements have been utilized in order to aid in the understanding of subject matter of the invention. It should be noted that the delay circuit, the gate circuit and the arithmetic (addition, subtraction) circuit constituting each unit transformation circuit are well-known conventional circuits in the electronic computer and the digital communication art, and may be easily constructed using known circuit techniques. Therefore, the detailed description of these known circuits has been omitted.

While we have shown and described only several embodiments in accordance with the present invention, it is understood that the same is not limited thereto, but is susceptible of numerous changes and modifications as known to those skilled in the art. For example, arrangements similar to the present invention may be obtained by combinations of different logic circuits. We therefore do not wish to be limited to the details shown and described herein, but intend to cover all such changes and modifications as are encompassed by the scope of the appended claims.

We claim:

1. An orthogonal transformation circuit including at least one unit transformation circuit for transforming discrete signals occurring at a predetermined period T, each unit transformation circuit comprising an input terminal for receiving the discrete signals to be transformed which occur at the period T, first delay means connected to said input terminal and having a delay period of $2^k \cdot T$ where $k = 0, 1, 2, 3 \ldots n-1$, arithmetic circuit means connected to the output of said first delay means and to said input terminal for alternately providing output signals at the period $2^k \cdot T$ of said first delay means that are a sum signal and a difference signal from said first delay means and a signal from said input terminal, and an output terminal being connected to said arithmetic circuit means.

2. An orthogonal transformation circuit according to claim 1, wherein said arithmetic circuit means is a digital circuit.

3. An orthogonal transformation circuit according to claim 1, wherein said arithmetic circuit means comprises adder means for providing an output signal which is the sum of the input and output of said first delay means, subtractor means for providing an output signal which is the difference of said input and output of said first delay means, second delay means connected to the output of said subtractor means and having the same delay period as said first delay means, and gating means for alternatively providing an output of said adder means and an output of said second delay means to said output terminal at a switching period which is the same as the delay period of said first and second delay means.

4. An orthogonal transformation circuit according to claim 1, wherein said arithmetic circuit means comprises an adder means for providing an output signal of the sum of the input and output signals which is said first delay means, second delay means having the same delay period as said first delay means, said second delay means being connected in series with said first delay means, subtractor means for providing an output signal which is the difference of input and output signals of said second delay means, and gating meanS for alternatively providing an output of said adder means and an output of said subtractor means to said output terminal at a switching period which is the same as the delay period of said first and second delay means.

5. An orthogonal transformation circuit according to claim 1, wherein said arithmetic circuit means comprises second delay means connected in series with said first delay means and having a delay period the same as said first delay means, negative logic means connected to an input of said second delay means for providing a negative output signal of the input signal applied thereto, first gating means alternately providing an output signal of the input of said first delay means and the output of the negative logic means, second gating means alternatively providing an output signal which is an input and an output of said second delay means, gate-driving signal circuit means for switching said respective gating means at the same time period as said delay period of said delay means, and adder means for providing an output signal of the sum of the outputs of said first and second gating means to said output terminal.

6. An orthogonal transformation circuit according to claim 1, wherein said unit transformation circuit is an integrated circuit.

7. An orthogonal transformation circuit according to claim 1 including $n$ plurality of said unit transformation circuits connected in cascade where $n$ is an integer, the delay and switching period $2^k \cdot T$ being different for each of said cascaded unit transformation circuits.

8. An orthogonal transformation circuit according to claim 7, wherein said arithmetic circuit means is a digital circuit.

9. An orthogonal transformation circuit according to claim 7, wherein said arithmetic circuit means comprises adder means for providing an output signal which is the sum of the input and output of said first delay means, subtractor means for providing an output signal which is the difference of said input and output of said first delay means, second delay means connected to the output of said subtractor means and having the same delay period as said first delay means, and gating means for alternately providing an output of said adder means and an output of said second delay means to said output terminal at a switching period which is the same as the delay period of said first and second delay means.

10. An orthogonal transformation circuit according to claim 7, wherein said arithmetic circuit means comprises an adder means for providing an output signal of the sum of the input and output signals of said first delay means, second delay means having the same delay period as said first delay means, said second delay means being connected in series with said first delay means, subtractor means for providing an output signal which is difference of input and output signals of said second delay means, and gating means for alternately providing an output of said adder means and an output of said subtractor means to said output terminal at a switching period which is the same as the delay period of said first and second delay means.

11. An orthogonal transformation circuit according to claim 7, wherein said arithmetic circuit means comprises second delay means connected in series with said first delay means and having a delay period the same as said first delay means, negative logic means connected to an input of said second delay means for providing a negative output signal of the input signal aPplied thereto, first gating means alternatively providing an output signal which is the input of said first delay means and the output of the negative logic means, second gating means alternately providing an output signal of an input and an output of said second delay means, gate-driving signal circuit means for switching said respective gating means at the same time period as said delay period of said delay means, and adder means for providing an output signal of the sum of the outputs of said first and second gating means to said output terminal.

12. A communication system having a transmitter station and a receiver station, each station having an orthogonal transformation circuit including at least one unit transformation circuit for transforming discrete signals occurring at a predetermined period T, each unit transformation circuit comprising an input terminal for receiving the discrete signals to be transformed which occur at the period T, first delay means connected to said input terminal and having a delay period of $2^k \cdot T$ where $k = 0, 1, 2, 3 \ldots n-1$, arithmetic circuit means connected to the output of said first delay means and to said input terminal for alternately providing output signals at the period $2^k \cdot T$ of said first delay means that are a sum signal and a difference signal from said first delay means and a signal from said input terminal, and an output terminal being connected to said arithmetic circuit means.

13. A communication system according to claim 12, wherein said orthogonal transformation circuit includes $n$ plurality of said unit transformation circuits connected in cascade where $n$ is an integer, the delay and switching period $2^k \cdot T$ being different for each of said cascaded unit transformation circuits, said cascaded unit transformation circuits at said transmitter station being cascaded in a predetermined arrangement and said cascaded unit transformation circuits at said receiver station being cascaded inversely to said predetermined arrangement.

14. A communication system according to claim 12, wherein said arithmetic circuit means comprises adder means for providing an output signal which is the sum of the input and output of said first delay means, subtractor means for providing an output signal of the difference of said input and output of said first delay means, second delay means connected to the output of said subtractor means and having the same delay period as said first delay means, and gating means for alternately providing an output of said adder means and an output of said second delay means to said output terminal at a switching period which is the same as the delay period of said first and second delay means.

15. A communication system according to claim 12, wherein said arithmetic circuit means comprises an adder means for providing an output signal of the sum of the input and output signals of said first delay means, second delay means having the same delay period as said first delay means, said second delay means being connected in series with said first delay means, subtractor means for providing an output signal of the difference of input and output signals of said second delay means, and gating means for alternately providing an output of said adder means and an output of said subtractor means to said output terminal at a switching period which is the same as the delay period of said first and second delay means.

16. A communication system according to claim 12, wherein said arithmetic circuit means comprises second delay means connected in series with said first delay means and having a delay period the same as said first delay means, negative logic means connected to an input of said second delay means for providing a negative output signal of the input signal applied thereto, first gating means alternatively providing an output signal of the input of said first delay means and the output of the negative logic means, second gating means alternately providing an output signal of an input and an output of said second delay means, gate-driving signal circuit means for switching said respective gating means at the same time period as said delay period of said delay means, and adder means for providing an output signal of the sum of the outputs of said first and second gating means to said output terminal.

* * * * *